Figure 2:
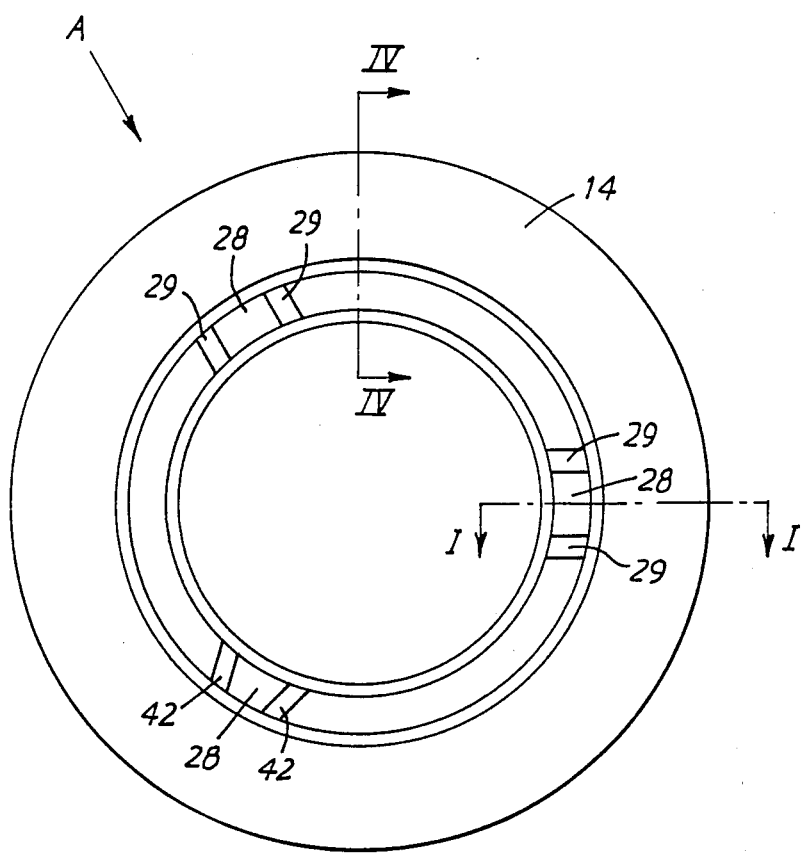

United States Patent [19]

Neal

[11] Patent Number: 4,557,612
[45] Date of Patent: Dec. 10, 1985

[54] SEALS FOR BEARINGS
[75] Inventor: Hubert W. T. Neal, Luton, England
[73] Assignee: SKF (U.K.) Limited, Luton, England
[21] Appl. No.: 610,253
[22] Filed: May 14, 1984
[30] Foreign Application Priority Data
  May 19, 1983 [GB] United Kingdom ............... 8313912
[51] Int. Cl.[4] .......................... F16C 33/78; F16J 15/36
[52] U.S. Cl. ..................................... 384/488; 277/68;
                                                    277/134; 384/477
[58] Field of Search ............... 384/477, 478, 135, 488;
        277/25, 212 F, 212 R, 134, 133, 67, 68, 69, 83

[56] References Cited
U.S. PATENT DOCUMENTS

| | | | |
|---|---|---|---|
| 1,977,081 | 10/1934 | Olsen | 277/133 |
| 2,353,988 | 7/1944 | Batesole et al. | 384/478 X |
| 2,386,639 | 10/1945 | Stafford | 384/478 |
| 2,856,208 | 10/1958 | Cobb | 277/133 X |
| 3,350,148 | 10/1967 | Sanguinetti et al. | 384/488 |

Primary Examiner—Stuart S. Levy
Assistant Examiner—Lynn M. Sohacki
Attorney, Agent, or Firm—Browdy and Neimark

[57] ABSTRACT

A ball bearing fitted with seals mounted on the outer bearing ring and co-operating with sealing surfaces on the inner bearing ring to prevent or restrict entry of fluid into the bearing. The axially outer face of each seal is formed with protrusions spaced at equal intervals around the seal and positioned adjacent its sealing surface, each protrusion having deflecting surfaces arranged to throw or deflect any debris on the sealing surface outwards away from the bearing upon relative rotation between the two members. Each seal comprises an annular disc-like body of resilient material and an annular reinforcing skirt of rigid material, the inner periphery of the body having an annular lip which projects into an annular groove in its sealing surface.

12 Claims, 12 Drawing Figures

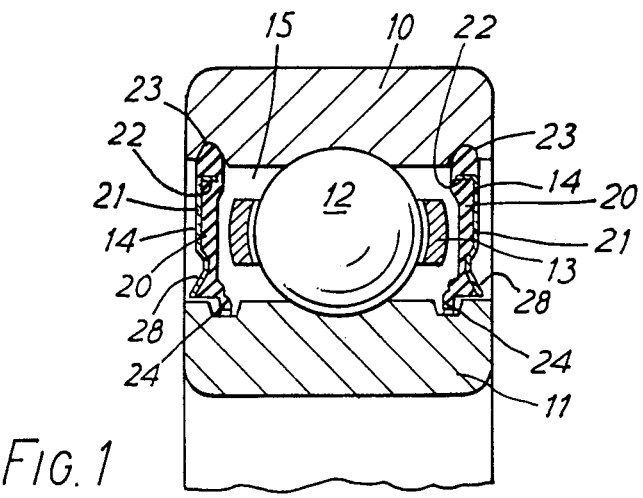
FIG. 1
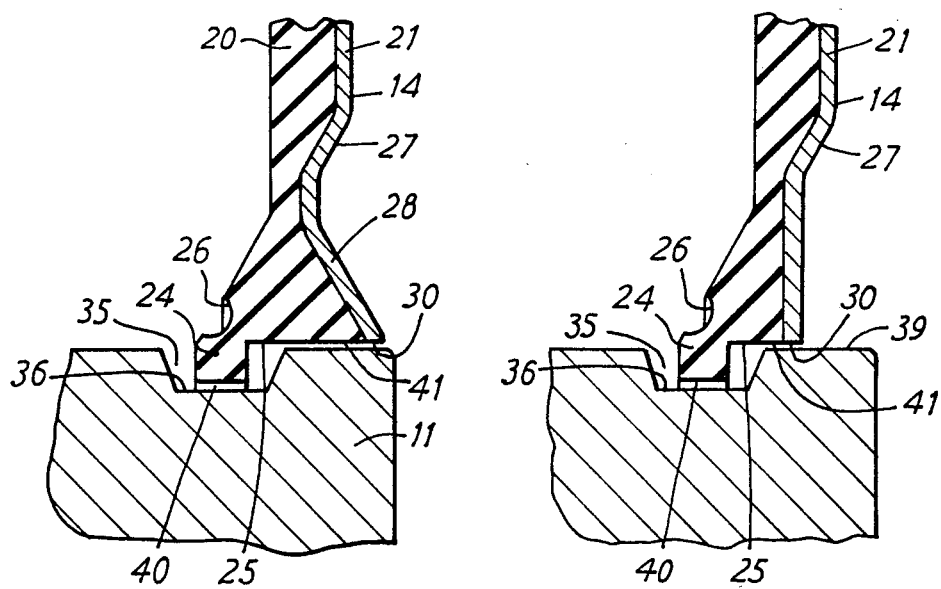
FIG. 3
FIG. 4

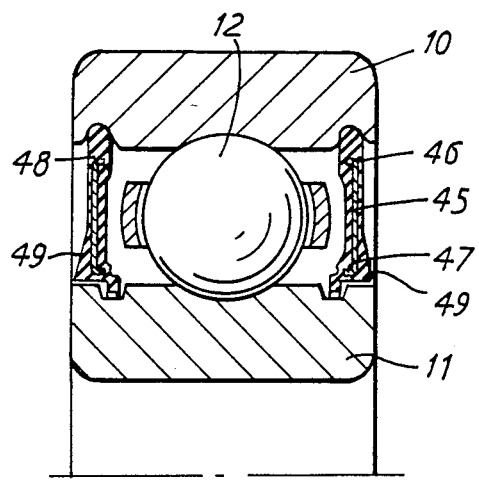
FIG. 6
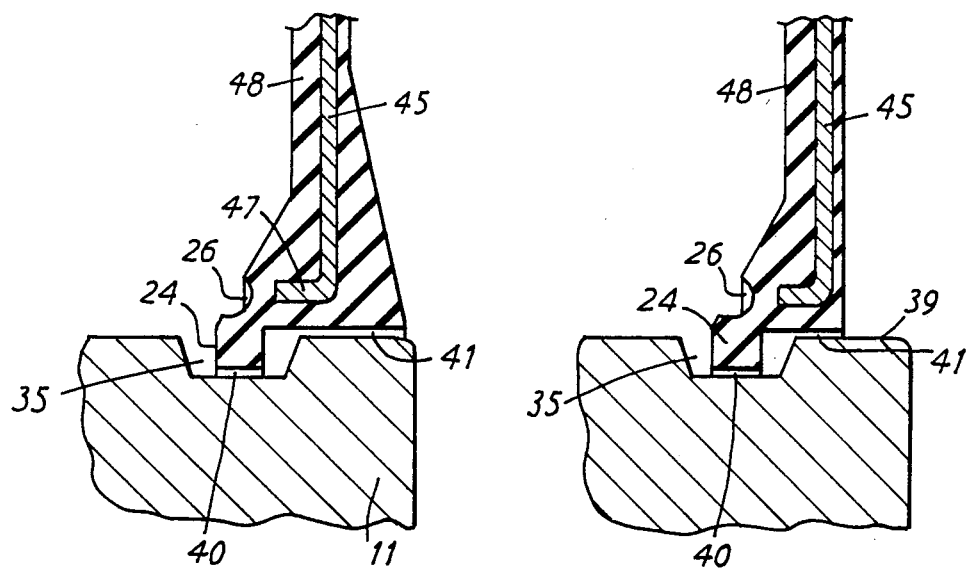
FIG. 8
FIG. 9

SEALS FOR BEARINGS

This invention relates to seals for bearings, and is concerned more particularly but not exclusively with seals for rolling bearings for use in oil lubricated machinery, such as for example gear boxes in vehicles.

The rolling bearings in an oil lubricated gear box in a vehicle are generally packed with grease and fitted with annular seals for retaining the grease within the bearing. It is common practice to use a grease which is compatible with the oil in the gear box, and to provide seals which allow a sufficient amount of gear box oil to enter the bearing for the purpose of supplementing and/or replacing the initial grease-fill in the bearing.

The lubricating oil in the gear box of a vehicle is generally contaminated with small particles of metal or other solid matter which originates from unclean components of the gear box or wear debris from the surfaces of the gears. In gear boxes where a gear wheel is mounted adjacent to a support bearing having a seal or inner ring land of a diameter similar to the diameter of the gear wheel, the bearing can be subjected to continuous impingement of gear box lubricating oil due to an axial jet of oil which can be forced out from between the teeth of the gear wheel meshing with an adjacent gear. To protect the rolling elements of the bearing from contaminants carried in the jets of oil or in the oil dispersed within the gear box by general movement of the parts, it has until now been the practice to use bearings fitted with side plates or contact rubbing seals and/or flinger-barriers mounted alongside the bearing. Such bearings however have the following disadvantages.

In bearings fitted with side plates, there is normally an excessive clearance between the bore of the side plate and the land of the bearing. Furthermore the gap between the inner periphery of the side plate and the land of the bearing provides an unobstructed opening in the axial direction leading into the interior of the bearing, and any debris on the land of the bearing may be forced by oil pressure into the bearing.

Bearings fitted with contact rubbing seals have the disadvantage that the exposed lip of the seal becomes worn with prolonged use. Moreover the seal lip tends to become damaged, probably due to contaminants in the oil becoming lodged between the seal lip and the land of the bearing. With contact seals there also exists the uncertainty whether oil will or will not enter the bearing in sufficient quantity to provide adequate lubrication or if only sufficient oil will pass into the bearing which in effect will leech the pre-packed grease from the bearing.

Bearings fitted with flingers/barriers have the disadvantage that they tend to operate with excessive clearance and form ineffective restriction to the ingress of contaminance. In addition they can take up a significant amount of axial and radial space around the bearings.

According to the present invention there is provided a rolling bearing comprising two co-axial bearing members rotatably mounted relative to one another by rolling elements disposed between the two members, one of said bearing members being formed with an annular sealing surface co-axial with the bearing member, and an annular seal mounted on the other bearing member and co-operating with the annular sealing surface to prevent or restrict passage of fluid therebetween, wherein the side of the annular seal facing away from the rolling elements if formed with one or more protrusions positioned adjacent said sealing surface and arranged to throw or deflect any debris on the sealing surface outwards away from the bearing upon relative rotation between the two members. The or each protrusion preferably has deflecting surfaces at the leading edges thereof in both directions of relative rotation between the bearing members, the deflecting surfaces converging toward one another in the axial direction away from the rolling elements. The deflecting surfaces preferably also converge towards one another in the radial direction away from the sealing surface.

The side of the annular seal adjacent the rolling elements is preferably provided on its periphery with an annular lip projecting into an annular groove on the sealing surface of the other bearing member to provide a barrier to ingress of debris and excessive volumes of oil into the bearing when operating under dynamic conditions.

The annular seal can conveniently be spaced with small clearance from the sealing surface on the other bearing member. This construction has the advantage that, since there is no sliding contact with the seal, there is no problem of change in torque with changes of temperature and pressure within the bearing.

Figure 5:
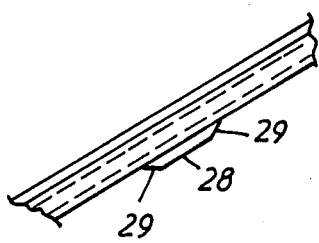
Figure 7:
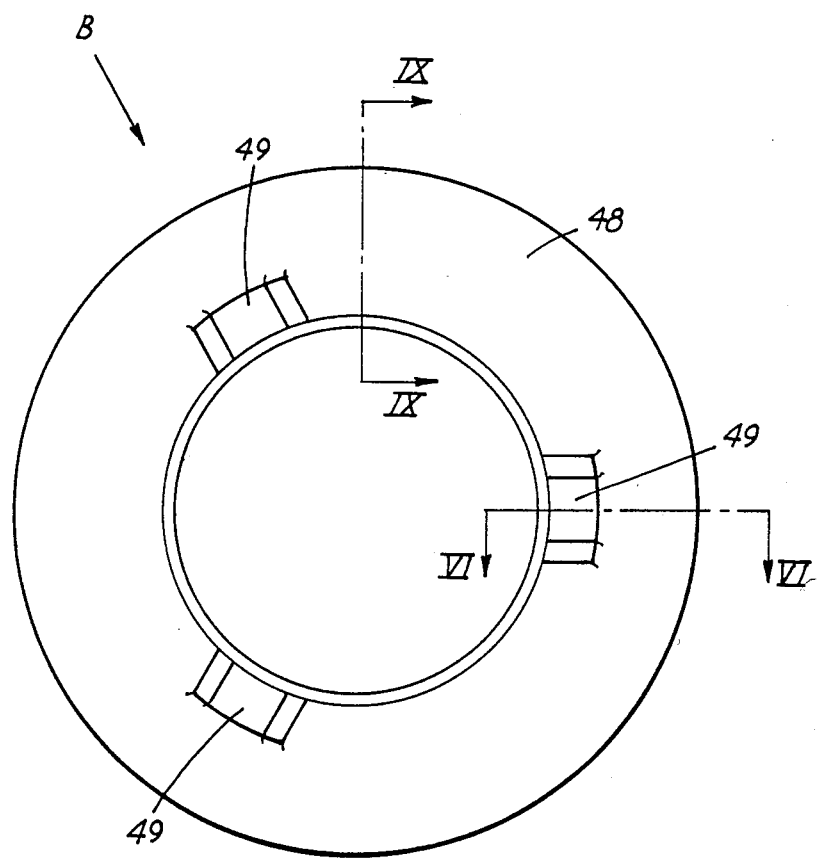
Figure 10:
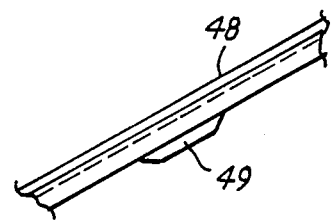
Figure 11:
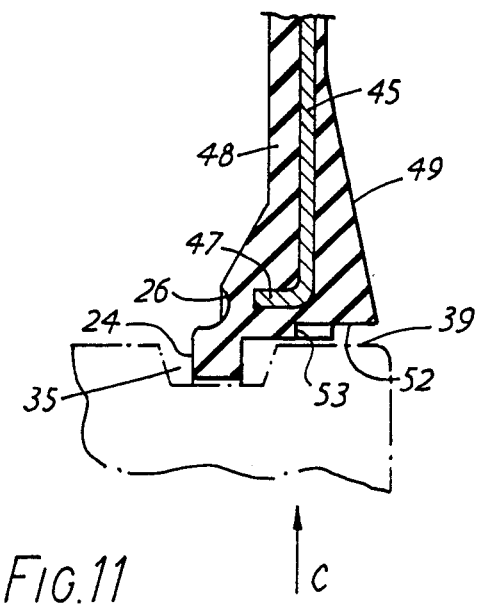
Figure 12:
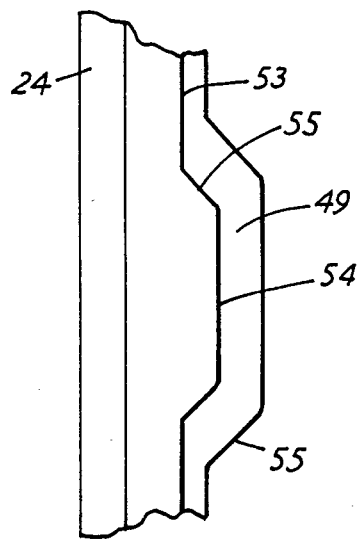

Embodiments of the invention will now be described, by way of example, with reference to the accompanying drawings, in which:

FIG. 1 is a cross section of part of a single row ball bearing assembly having seals in accordance with the invention, FIG. 2 is a side elevation of one of the seals of the bearing assembly of FIG. 1, the cross section in FIG. 1 being taken along the line I—I in FIG. 2, FIG. 3 is a detail view on an enlarged scale of part of one of the seals and the co-operating sealing surface on an inner bearing ring of the bearing assembly as shown in FIG. 1, FIG. 4 is a detail view similar to FIG. 3 but showing the seal in cross section as viewed along the line IV—IV in FIG. 2, FIG. 5 is a detail view of part of the seal of FIG. 2 as viewed in the direction of arrow A in FIG. 2, FIG. 6 is a cross section of part of a ball bearing assembly having seals of a different construction to those shown in FIG. 1, FIG. 7 is a side elevation of one of the seals of the bearing assembly of FIG. 6, the cross section in FIG. 6 being taken along the line VI—VI in FIG. 7, FIG. 8 is a detail view on an enlarged scale of part of one of the seals and the co-operating sealing surface on the inner bearing ring of the bearing assembly as shown in FIG. 6, FIG. 9 is a detail view similar to FIG. 8 but showing the seal in cross section as viewed along the line IX—IX in FIG. 7, FIG. 10 is a detail view of part of the seal of FIG. 7 as viewed in the direction of arrow B in FIG. 7, FIG. 11 is a cross section of part of another construction of seal and the co-operating sealing surface on the inner bearing ring of a bearing assembly according to the invention, and FIG. 12 is a view of the underside of the seal of FIG. 11 as viewed in the direction of arrow C.

The ball bearing assembly of FIGS. 1–5 comprises an outer bearing ring 10 and an inner bearing ring 11 rotatably mounted within the outer ring 10 by a plurality of balls 12 in rolling engagement with groove tracks on the inner and outer surfaces of the rings 10, 11 respectively. The balls 12 are held in spaced relationship around the bearing rings by a cage 13. Two annular seals 14 are mounted one on each side of the outer bearing ring, the inner periphery of the two seals being spaced with small clearance from the outer surface of the inner bearing ring so that the two seals co-operate with the two bearing rings to form an annular chamber 15 in which the balls are enclosed.

Each seal 14 comprises an annular disc-like body 20 of rubber or other resilient material, and an annular reinforcing skirt 21 of metal or other rigid material bonded to the outboard side of the body 20, the radially outer rim of the skirt 21 being turned axially inwards to form a flange 22 which is embedded in the body 20. The radially outer portion of the body 20 has a greater thickness than the centre portion thereof, and the outer periphery of the body is of rounded section and is a snap fit in an annular groove 23 in the inner surface of the outer bearing ring. The radially inner portion of the body 20 has the inboard side thereof inclined axially and radially inwards to provide a thicker section at the inner periphery, and the inboard side of the inner periphery is formed with an annular lip 24 of substantially square section projecting radially inwards. The remainder of the inner periphery of the body 20 has a cylindrical surface 25. The inboard side of the body 20 immediately above the lip 24 is formed with an annular groove 26 for a purpose described hereinafter.

The centre portion of the skirt 21 of the seal is cranked axially and radially inwards as shown at 27 in FIG. 4. The radially inner portion of the skirt 21 throughout most of its periphery lies in a radial plane inset axially inwards from the radially outer portion of the skirt as shown in FIG. 4, but the parts of the radially inner portion of the skirt at three spaced locations around the skirt are inclined axially outwards and radially inwards as shown in FIG. 3 to form three protrusions 28 on the outboard side of the seal as shown in FIG. 2. The sides of each protrusion are chamfered as shown in FIG. 5 to form deflecting surfaces 29 which converge towards one another in the direction away from the bearing. The body 20 is moulded into the cavities formed on the inboard side of the skirt by the protrusions 28, and the inner peripheral surface 30 of the skirt 21 is flush with the cylindrical surface 25 on the inner periphery of the body 20.

Each side of the inner bearing ring 11 is formed on its outer periphery with an annular groove 35 spaced axially inwards from the adjacent side of the bearing ring. The groove 35 has a cylindrical base 36 and two side walls which diverge from one another in the radially outwards direction. The width of the base 36 is substantially greater than that of the lip 24 on the associated seal. The peripheral surface 39 between the groove 35 and the side of the inner bearing ring is cylindrical.

In the assembled bearing the lip 24 on the inner periphery of each seal projects into the groove 35 on the inner bearing ring and is spaced with only a small clearance gap 40 from the base 36 of the groove. The surfaces 25 and 30 on the remainder of the inner periphery of the seal are spaced with only a relatively small clearance gap 41 from the cylindrical surface 39 on the inner bearing ring. The bearing chamber 15 is charged with grease.

In operation, the co-operation of the lip 24 of each seal with its groove 35 and the narrow clearance gaps 40, 41 between the seal and the inner bearing ring provide an effective barrier against ingress of debris or excessive quantities of oil into the bearing chamber. In addition, upon rotation of the inner bearing ring inside the outer bearing ring or upon rotation of the outer bearing ring on the inner bearing ring, the deflecting surfaces 29 at the leading edges of the protrusions engages against any debris which may accumulate on the surface 39 of the inner bearing ring at the mouth of the clearance gap 41 and deflect the debris axially outwards away from the bearing. The protrusions also serve to deflect away from the mouth of the gap 41 an excess of oil which may be circulating around the bearing due to rotation of adjacent gearing.

The tapering cross section of the protrusions 28 as shown in FIG. 3 effectively avoids debris being trapped between the protrusions and adjacent rotating machinery. Each of the protrusions 28 may have its two deflecting surfaces 29 converging towards one another in the radially outward direction as shown at 42 in FIG. 2 as an additional precaution to prevent debris being trapped between the protrusions and adjacent rotating machinery.

When the bearing is stationary, the lips 24 increase the effectiveness of the clearance gaps 40, 41 in preventing entry of foreign matter into the bearing chamber.

The annular seals 14 may be mounted in the bearing by the following procedure. Each seal is first mounted on a cylindrical dolly having a diameter substantially equal to the external diameter of the inner bearing ring, with the skirt 21 inboard of the body 20, so that the lip 24 will be deflected radially outwards. Such deflection is possible due to the clearance provided by the annular groove 26. The dolly and the seal are then presented to the side face of the inner bearing ring and the seal moved axially off the dolly and on to the cylindrical surface 39 of the bearing ring. The seal can then be moved further axially onto the inner bearing ring until the lip 24 engages in the groove 35 and the outer periphery of the seal engages in the groove 23 in the outer bearing ring. The seal is retained by the groove 23 in the outer bearing ring and is, in operation, normally stationary with respect to the outer bearing ring.

The ball bearing assembly of FIGS. 6–10 is similar in construction to that of the bearing of FIGS. 1–5, except for details of the construction of the seals, and like parts are denoted by like reference numerals in FIGS. 1–10.

In the seals of FIGS. 6–10 the reinforcing skirt 45 comprises a flat annular disc having the inner and outer rims turned axially inwards to form flanges 46, 47 and the skirt 45 is embedded wholly within the body 48 of the seal. Protrusions 49, identical in shape to the protrusions 28 of FIGS. 1–5, are moulded in the outboard side of the body 48 of the seal.

The seal of FIGS. 11 and 12 is similar to the seal of FIGS. 6–10 except that the inner peripheral surface 52 is stepped and the side wall 53 of the step at spaced locations around the seal is shaped to form protrusions 54, one of which is shown in FIG. 12 as viewed from the underside of the seal. The side edges of each protrusion are chamfered as shown in FIG. 12 to form deflecting surfaces 55 arranged to deflect axially outwards any small debris which may accumulate on the outer surface 39 of the inner bearing ring, upon relative rotation between the seal and the inner bearing ring.

I claim:

1. A rolling bearing comprising two co-axial bearing members rotatably mounted relative to one another by rolling elements disposed between the two members, one of said bearing members being formed with an annular sealing surface co-axial with the bearing member, and an annular seal mounted on the other bearing member and co-operating with the annular sealing surface to prevent or restrict passage of fluid therebetween, wherein the wall of the annular seal facing away from the rolling elements is formed with one or more protrusions positioned adjacent said sealing surface, and the one or more protrusions has side surfaces which form the leading edges of the protrusion in both directions of relative rotation between the bearing members, said side surfaces converging towards one another in the axial direction away from the rolling elements, whereby said side surfaces form deflecting surfaces which throw or deflect any debris engaged therewith outwards away from the bearing upon rotation of either of the two members in either direction of rotation.

2. A rolling bearing as claimed in claim 1, wherein said side surfaces which form the deflecting surfaces converge towards one another in the radial direction away from the sealing surface.

3. A rolling bearing as claimed in claim 1, wherein the axially outer surface of the projection extending between said side surfaces is inclined axially outwards in the radial direction towards the sealing surface.

4. A rolling bearing as claimed in claim 1, wherein the annular seal comprises an annular disc-like body of resilient material and an annular reinforcing skirt of rigid material bonded to the side of the body facing away from the rolling elements, a periphery of the skirt being spaced with small clearance from the sealing surface, and the part of the skirt adjacent the sealing surface being formed with said protrusion or protrusions.

5. A rolling bearing as claimed in claim 4, wherein the centre portion of the skirt is cranked axially inwards and the peripheral portions of the skirt between said protrusions are inset axially inwards relative to the remainder of the skirt in the direction towards the rolling elements.

6. A rolling bearing as claimed in claim 1, wherein the peripheral surface of the annular seal which is adjacent the sealing surface is formed with an annular step, and the radial face of the step is formed with said protrusion or protrusions.

7. A rolling bearing comprising an inner bearing ring rotatably mounted in an outer bearing ring by rolling elements between the two rings, the outer periphery of the inner bearing ring being formed with annular sealing surfaces one on each side of the rolling elements, and two annular seals mounted on the outer bearing ring and each co-operating with a separate one of the sealing surfaces to prevent or restrict passage of fluid into the bearing, wherein the wall of each annular seal facing away from the rolling elments is formed with one or more protrusions positioned adjacent its sealing surface, the one or more protrusions has side surfaces which form the leading edges of the protrusion in both directions of relative rotation between the bearing members, said side surfaces converging towards one another in the axial direction away from the rolling elements so that said side surfaces form deflecting surfaces which throw or deflect any debris engaged therewith outwards away from the bearing upon relative rotation between the two members in either direction of rotation, the axially outer surface of the projection extending between said side surfaces is inclined axially outwards in the radially inwards direction, each seal comprises an annular disc-like body of resilient material and an annular reinforcing skirt of rigid material, each of the sealing surfaces is formed with an annular groove at the end thereof adjacent the rolling elements, and the inner periphery of the body of each seal is formed with an annular lip which projects into said annular groove in the associated sealing surface, the annular seal being spaced with small clearance from the sealing surface and the lip being spaced with small clearance from the base of the annular groove.

8. A rolling bearing as claimed in claim 7, wherein each seal is formed with three protrusions spaced at equal intervals around the seal.

9. A rolling bearing comprising two co-axial bearing members rotatably mounted relative to one another by rolling elements disposed between the two members, one of said bearing members being formed with an annular sealing surface co-axial with the bearing member, and an annular seal mounted on the other bearing member and co-operating with the annular sealing surface to prevent or restrict passage of fluid therebetween, wherein the wall of the annular seal facing away from the rolling elements is formed with one or more protrusions positioned adjacent said sealing surface, and the one or more protrusions has a side thereof which forms the leading edge of the protrusion in one direction of relative rotation between the bearing members, said side of the protrusion being inclined rearwardly in the axially outer direction relative to said one direction of rotation so that said side forms a deflecting surface arranged to throw or deflect any debris engaged therewith outwards away from the bearing upon relative rotation in said one direction.

10. A rolling bearing comprising two co-axial bearing members rotatably mounted relative to one another by rolling elements disposed between the two members, one of said bearing members being formed with an annular sealing surface co-axial with the bearing member, and an annular seal mounted on the other bearing member and co-operating with the annular sealing surface to prevent or restrict passage of fluid therebetween, wherein the seal comprises an annular disc-like body of resilient material and an annular reinforcing skirt of rigid material, the side of the sealing surface adjacent the rolling elements is formed with an annular groove, the peripheral surface of the resilient body of the seal is formed with an annular lip which projects into said annular groove, the wall of the annular seal facing away from the rolling elements is formed with one or more protrusions positioned adjacent said sealing surface, and the one or more protrusions has opposing side surfaces which form the leading edges of the protrusion in both directions of relative rotation between the bearing members, said side surfaces converging towards one another in the axial direction away from the rolling elements so that said side surfaces form deflecting surfaces which throw or deflect any debris engaged therewith outwards away from the bearing upon rotation of either of the two members in either direction of rotation.

11. A rolling bearing as claimed in claim 9, wherein said sealing surface is cylindrical and is formed with an annular groove at the side thereof adjacent the rolling elements, the seal comprises an annular disc-like body of resilient material formed with an annular lip which projects into said annular groove, the body of the seal being spaced with small clearance from the cylindrical sealing surface, the lip being spaced with small clearance from the base of said annular groove, and the body of the seal adjacent the lip being deformable to permit flexure of the lip onto the cylindrical sealing surface upon mounting of the seal in the bearing.

12. A rolling bearing as claimed in claim 11, wherein said annular lip is formed on the inboard side of the periphery of the body of the seal, and the inboard side of the body adjacent said lip is formed with an annular groove to permit said flexure of the body.

* * * * *